United States Patent
Kaskawitz et al.

(10) Patent No.: US 10,798,875 B2
(45) Date of Patent: Oct. 13, 2020

(54) DISCHARGE GUARD ASSEMBLY FOR A MOWER

(71) Applicant: Honda Motor Co., Ltd., Tokyo (JP)

(72) Inventors: Scott Kaskawitz, Hillsborough, NC (US); Teegan L Kelly, Burlington, NC (US); Surender Kumar, Mebane, NC (US)

(73) Assignee: Honda Motor Co., Ltd., Tokyo (JP)

(*) Notice: Subject to any disclaimer, the term of this patent is extended or adjusted under 35 U.S.C. 154(b) by 372 days.

(21) Appl. No.: 15/630,674

(22) Filed: Jun. 22, 2017

(65) Prior Publication Data
US 2018/0368313 A1 Dec. 27, 2018

(51) Int. Cl.
| | |
|---|---|
| *A01D 34/00* | (2006.01) |
| *A01D 34/71* | (2006.01) |
| *A01D 34/81* | (2006.01) |
| *A01D 34/82* | (2006.01) |
| *A01D 101/00* | (2006.01) |
| *A01D 34/18* | (2006.01) |

(52) U.S. Cl.
CPC ............ *A01D 34/18* (2013.01); *A01D 34/005* (2013.01); *A01D 34/71* (2013.01); *A01D 34/81* (2013.01); *A01D 34/824* (2013.01); *A01D 2101/00* (2013.01)

(58) Field of Classification Search
CPC ...... A01D 34/71; A01D 34/81; A01D 34/005; A01D 42/005; A01D 34/828; E05B 57/00
USPC ........... 56/202–205; 292/194, 195, 202, 304, 292/DIG. 63
See application file for complete search history.

(56) References Cited

U.S. PATENT DOCUMENTS

| | | | |
|---|---|---|---|
| 3,404,519 A * | 10/1968 | Demers | A01D 34/828 56/14.7 |
| 3,423,918 A | 1/1969 | Siwek | |
| 3,503,194 A * | 3/1970 | Ritums | A01D 34/71 56/255 |
| 3,636,686 A * | 1/1972 | Meyer | A01D 34/49 56/320.2 |
| 3,694,855 A | 10/1972 | Meyer et al. | |
| 3,726,069 A * | 4/1973 | Cope | A01D 34/71 56/202 |

(Continued)

FOREIGN PATENT DOCUMENTS

| | | |
|---|---|---|
| CN | 205357162 U | 7/2016 |
| DE | 202015005429 U1 | 9/2015 |
| EP | 0882387 A1 | 12/1998 |

OTHER PUBLICATIONS

European Search Report for EP Patent Application, EP18178742 issued from the European Patent Office, dated Oct. 23, 2018.

*Primary Examiner* — Thomas B Will
*Assistant Examiner* — Joan D Misa
(74) *Attorney, Agent, or Firm* — American Honda Motor Co., Inc.; Clifford B Vaterlaus

(57) ABSTRACT

A discharge guard assembly for a mower includes a cutter housing having an opening for discharging cuttings. A guard is hingedly attached to the housing so that the guard can move between a closed position and an open position. A latch contacts a stop on the guard to hold the guard in the closed position to allow the mower to operate in a mulching configuration. The latch is movable to an unlatched position in which the guard is free to rotate to the open position to allow cuttings to be discharged through the opening in the housing.

20 Claims, 9 Drawing Sheets

(56) References Cited

U.S. PATENT DOCUMENTS

| | | | |
|---|---|---|---|
| 3,750,378 A * | 8/1973 | Thorud | A01D 43/0631 56/10.5 |
| 3,844,597 A | 10/1974 | Elrod et al. | |
| 3,872,656 A * | 3/1975 | Dahl | A01D 43/0631 56/202 |
| 3,962,852 A * | 6/1976 | Boyer | A01D 43/063 56/202 |
| 4,008,559 A | 2/1977 | Lessig, III et al. | |
| 4,041,682 A * | 8/1977 | Kidd | A01D 34/71 56/320.2 |
| 4,043,102 A * | 8/1977 | Uhlinger | A01D 43/0631 56/17.4 |
| 4,214,424 A | 7/1980 | Gobin | |
| 4,395,784 A | 8/1983 | Foster | |
| 4,726,177 A | 2/1988 | McGoughy | |
| 4,800,712 A | 1/1989 | Morse et al. | |
| 5,189,870 A * | 3/1993 | Hohnl | A01D 43/0631 56/16.6 |
| 5,442,902 A * | 8/1995 | Mosley | A01D 42/005 56/17.5 |
| 5,913,804 A | 6/1999 | Benway | |
| 5,992,135 A * | 11/1999 | Benway | A01D 34/71 56/200 |
| 7,526,909 B1 * | 5/2009 | Procter | A01D 34/005 56/320.2 |
| 7,610,742 B2 * | 11/2009 | Imanishi | A01D 34/71 56/320.1 |
| 7,624,562 B2 * | 12/2009 | Kallevig | A01D 34/71 56/320.2 |
| 7,980,050 B2 * | 7/2011 | Imanishi | A01D 34/71 56/320.2 |
| 8,104,255 B1 * | 1/2012 | Hurst | A01D 34/71 56/220 |
| 9,775,289 B2 * | 10/2017 | Sawyer, Jr. | A01D 34/71 |
| 9,807,929 B2 * | 11/2017 | Lopez | A01D 34/71 |
| 2003/0182919 A1 | 10/2003 | Baumann et al. | |
| 2006/0272309 A1 | 12/2006 | Moore | |
| 2018/0184590 A1 * | 7/2018 | Takahashi | A01D 34/68 |
| 2019/0075723 A1 * | 3/2019 | Spitz | A01D 34/71 |

* cited by examiner

DISCHARGE GUARD ASSEMBLY FOR A MOWER

BACKGROUND

The subject matter disclosed herein relates to lawnmowers. More particularly, the subject matter disclosed herein relates to apparatuses for use with lawnmowers for holding a discharge guard in a closed position in a mulching mode, and allowing the guard to be opened to convert the lawnmower to a discharge mode.

A number of options exist for managing grass clippings produced by a lawnmower. One option is to collect the clippings in a bag or other container and remove the clippings. Bagging has the advantage of removing clippings from a lawn entirely, leaving a very clean-looking lawn. Bagging does require, however, time to empty the bag and dispose of the clippings. In addition, removing the clippings from the lawn can deprive the remaining grass of the benefit of the nutrients contained in the clippings (e.g., nitrogen, water). As a result, additional fertilizer treatments may be needed to account for the removal of these nutrients.

Another option is to discharge the grass clippings away from the lawnmower. This option requires less equipment (e.g., bagging system), and eliminates the need to empty bags. Rather, the clippings can just be left on the lawn to fertilize the yard. If the grass clippings are relatively short, this option can provide aesthetically acceptable results, but if the clippings are too long, they can be considered unsightly when left on the lawn. Alternatively, the clippings can be collected after the fact, but such collection creates many of the same problems as bagging with regard to disposing of the clippings.

A third option is to mulch the clippings for reincorporation into the lawn, thereby eliminating the need to dispose of grass clippings. In addition, mulching can help to provide the soil with increased ground cover to hold moisture, and the mulched clippings can act as a fertilizer. There are also disadvantages, however, to mulching systems. For instance, mulching can require special blades or a specifically-designed housing shape. Also, if the grass is particularly tall, thick, or wet, mulching systems can put high strains on the lawnmower because of the high volume and/or high density of the clippings.

Guards or covers are sometimes provided on lawnmower cutter housings to cover discharge openings in the cutter housings. The guards may be closed to operate the lawnmower in a mulching configuration, and opened to operate the lawnmower in a discharge or bagging configuration. It may be advantageous in some circumstances to hold the guards in the closed position. However, the known lawnmowers lack designs that allow for an easy, convenient, and effective mechanism to hold the guards in the closed position, and allow the guards to be moved to an opened position when desired.

SUMMARY

In accordance with one embodiment of the present disclosure, a discharge guard assembly for a mower is provided. The assembly includes a cutter housing having an opening for discharging cuttings. A guard is attached to the housing for moving between a closed position in which the guard covers the opening and an open position. A pin connects the guard to the cutter housing. A latch having a catch is provided for holding the guard in the closed position, and a stop is formed on the guard. The latch is movable from a latched position, in which the catch contacts the stop to hold the guard in the closed position, to an unlatched position in which the guard is free to rotate about the pin.

In accordance with another embodiment of the present disclosure, a discharge guard assembly for a mower is provided. The assembly includes a cutter housing having an opening for discharging cuttings. A guard is attached to the cutter housing, the guard being movable between a closed position, in which the guard covers the opening, and an open position. A latch is provided for holding the guard in the closed position. A bracket is attached to the cutter housing, wherein the guard and the latch are both attached to the cutter housing by the bracket.

In accordance with yet a further embodiment of the present disclosure, a discharge guard assembly for a mower is provided including a cutter housing having an opening for discharging cuttings. The assembly includes a guard attached to the housing for rotatable movement about a first axis between a closed position, in which the guard covers the opening, and an open position. A latch is attached to the housing and is rotatable about a second axis that is substantially vertical. The latch has a catch for holding the guard in the closed position.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-10, wherein like numbers indicate the same or corresponding elements throughout the views.

Figure 1:
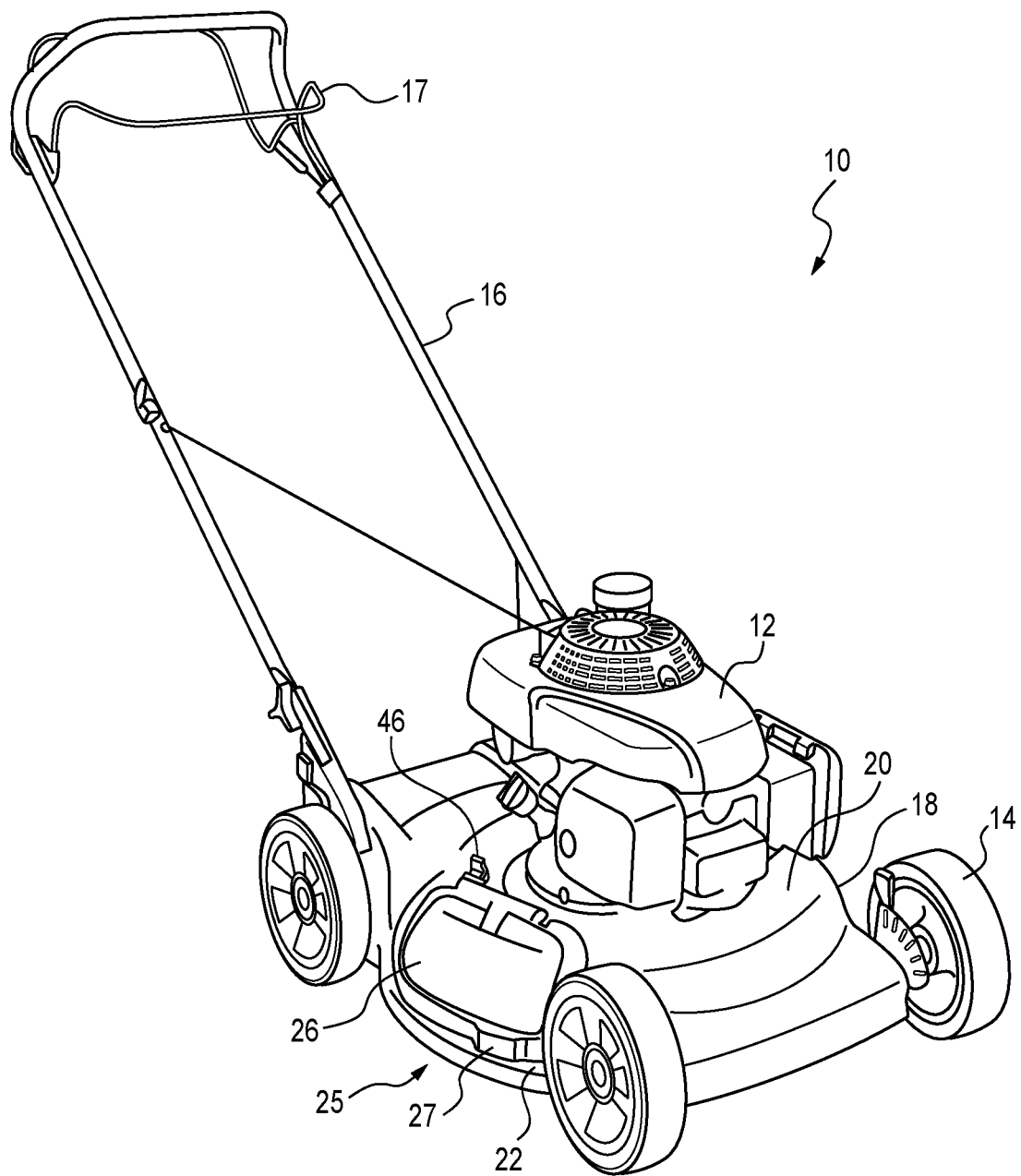
FIG. 1 is a front perspective view depicting a mower in accordance with one embodiment of the present disclosure.

FIG. 1 illustrates a perspective view of a lawnmower or mower, indicated generally at 10, in accordance with one embodiment of the present disclosure. It will be understood that the principles of the present disclosure may be used in alternative embodiments, for example, with other power equipment devices, such as riding lawnmowers, snow blowers and the like.

The mower 10 may include a power source 12, such as an internal combustion engine or electric motor, for powering a cutting blade (not shown). The mower 10 may also include wheels 14 in a configuration known to those skilled in the art. In one embodiment, a pair of the wheels 14 may be driven by the power source 12. Alternatively, the mower 10 may be configured to be pushed by a user without assistance from the power source 12. A mower handle 16 may extend rearwardly for being grasped by an operator to push and/or maneuver the mower 10. In addition, the mower 10 may include controls 17 for operating aspects of the mower 10, such as the power source 12 and the cutting blade.

The mower 10 may also include a cutter housing 18 for supporting the power source 12, wheels 14, handle 16 and cutting blade. The cutter housing 18 may have an upper wall 20 extending in a lateral direction, and a side wall 22 having a substantially cylindrical shape extending downwardly from the upper wall 20. An opening 24, shown most clearly in FIG. 2, may be formed in the side wall 22 for allowing grass cuttings generated by the cutting blade within the cutter housing 18 to be discharged. The depicted embodiment of the mower 10 includes the opening 24 on a side of the mower 10. However, it will be understood that the opening 24 may be located elsewhere on the mower 10, such as on the rear of the mower 10 by the handle 16.

It will be understood that various features of the mower 10 may combine to form a discharge guard assembly, indicated generally at 25. For example, a guard 26 may be attached to the cutter housing 18 over the opening 24 for moving between a closed position in which the guard 26 covers the opening 24 and an open position in which cuttings can be discharged through the opening 24, as discussed more fully below. To facilitate movement of the guard 26, the guard 26 may include a guard handle 27 for grasping by a user to move the guard 26 from the closed position to the open position. The guard handle 27 may be located on a lower edge of the guard 26 or other suitable location.

The guard 26 may contoured to correspond to the side wall 22 of the cutter housing 18. Accordingly, as viewed from the top, the guard 26 may be curved to correspond to a portion of the cylindrically shaped side wall 22. Similarly, as viewed from an end of the guard 26, the guard 26 may be curved from top to bottom. It will be understood that the guard 26 may have alternate shapes to correspond to the side wall 22 and opening 24. For example, some embodiments of the guard 26 may be planar and may have any variety of shapes, such as rectangular or circular.

Figure 2:
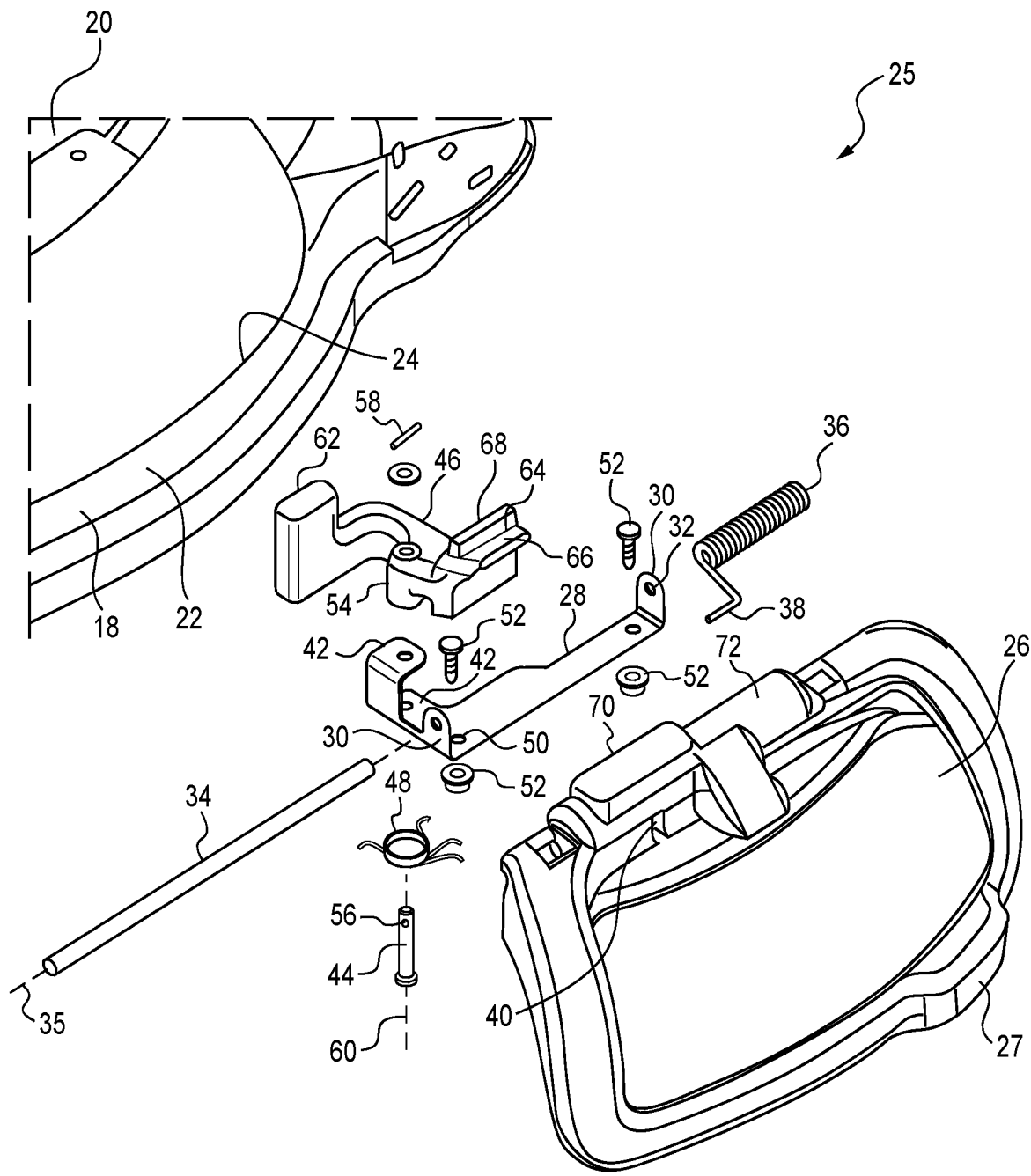
FIG. 2 is an exploded perspective view of one embodiment of a discharge guard assembly of the mower of FIG. 1.

Referring now to FIG. 2, an exploded perspective view of one embodiment of a discharge guard assembly 25 of the mower 10 of FIG. 1 is shown. The guard 26 may be attached to the cutter housing 18 by a bracket 28. The bracket 28 may have a first pair of spaced apart tabs 30 with openings 32 for receiving a hinge pin 34. The pin 34 may be connected to the guard 26 to hingedly attach the guard 26 to the cutter housing 18. Accordingly, the guard 26 can be attached to the cutter housing 18 to rotate about the pin 34 such that the pin 34 defines a first rotational axis 35. A first biasing member 36, such as a spring or torsion spring, may be coiled around the pin 34 and may have a leg 38 that may engage the guard 26 for biasing the guard in the closed position. In one embodiment, the guard 26 may have a receiver 40 in the form of a through-hole for receiving the leg 38 of the first biasing member 36.

The bracket 28 may have a second pair of spaced apart tabs 42 for receiving a latch pin 44 for attaching a latch 46 to the cutter housing 18. A second biasing member 48, such as a spring or torsion spring, may be coiled around the latch pin 44 for biasing the latch 46 to a latched position. The bracket 28 may also include a plurality of fastener openings 50 for receiving fasteners 52 for attaching the bracket 28 to the cutter housing 18. The fasteners 52 may include threaded fasteners, or alternatively, the bracket 28 may be attached to the cutter housing 18 using rivets, welds, snap-in fasteners, or any other suitable fastening mechanism known to those skilled in the art. It will be understood that the configuration of the bracket 28 may be arranged to attach both the guard 26 and the latch 46 to the cutter housing 18. Thus, the number of parts required may be reduced, and manufacturing and assembly can be facilitated.

The latch 46 may include a collar 54 for being received between the second pair of spaced apart tabs 42. The collar 54 may define a bore for receiving the latch pin 44. One embodiment of the latch pin 44 may include an attachment opening 56 for receiving a connecting pin 58 for attaching the latch 46 to the bracket 28. Accordingly, the latch 46 may be rotatably attached to the bracket 28 to pivot about the latch pin 44. The latch pin 44 may define a second rotational axis 60 that extends in a substantially vertical direction.

The latch 46 may form a lever handle 62 on one end. The handle 62 may include a surficial area for a user to apply a force to rotate the latch 46. A catch 64 may be located on the latch 46 on an end opposite the handle 62 with the collar 54 between the handle 62 and the catch 64. The catch 64 may include a lateral extending portion 66 and an upward extending portion 68 to contact a stop 70 formed on the guard 26.

Figure 3:
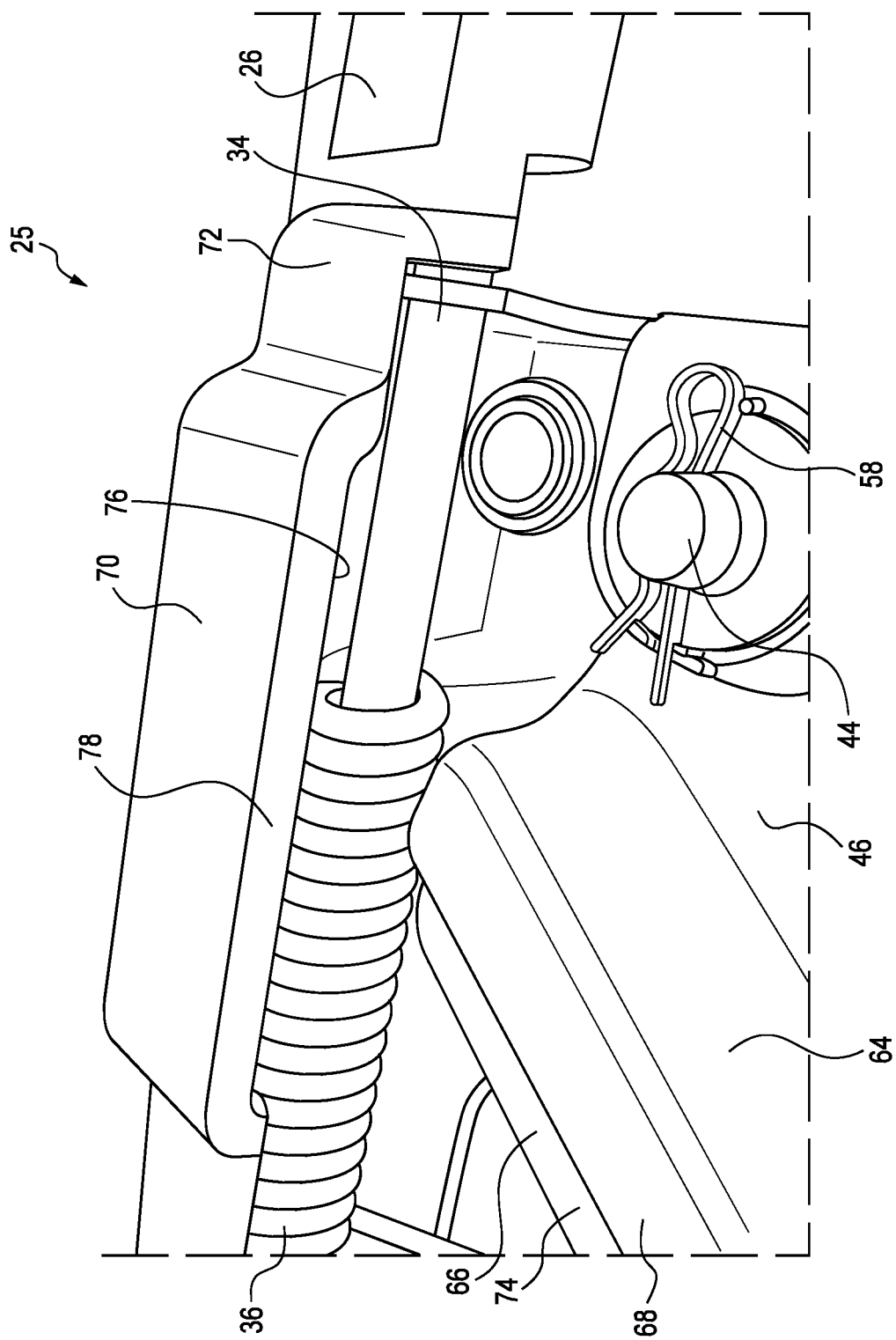
FIG. 3 is a rear perspective view of a portion of the discharge guard assembly of FIG. 2.

As shown in FIG. 3, which shows a rear perspective view of a portion of the discharge guard assembly 25, the guard 26 may include a sleeve 72 for receiving the pin 34 and the first biasing member 36. The stop 70 may be formed as a projection on the sleeve 72 defining one or more surfaces to abut with the catch 64 when the latch 46 is in the latched position. Alternatively, it will be understood that the stop may be formed with portions of the sleeve 72 or other portions of the guard 26. In one embodiment the stop 70 extends along a length of the pin 34. The lateral extending portion 66 of the catch 64 may be positioned in a space between the stop 70 and the pin 34 when the latch 46 is in the latched position. Accordingly, an upper surface 74 of the lateral extending portion 66 may contact a lower surface 76 of the stop 70 when the guard 26 is rotated toward the open position. Also, the upward extending portion 68 may contact an edge 78 of the stop 70 to assist in holding the guard 26 in the latched position.

Figure 4:
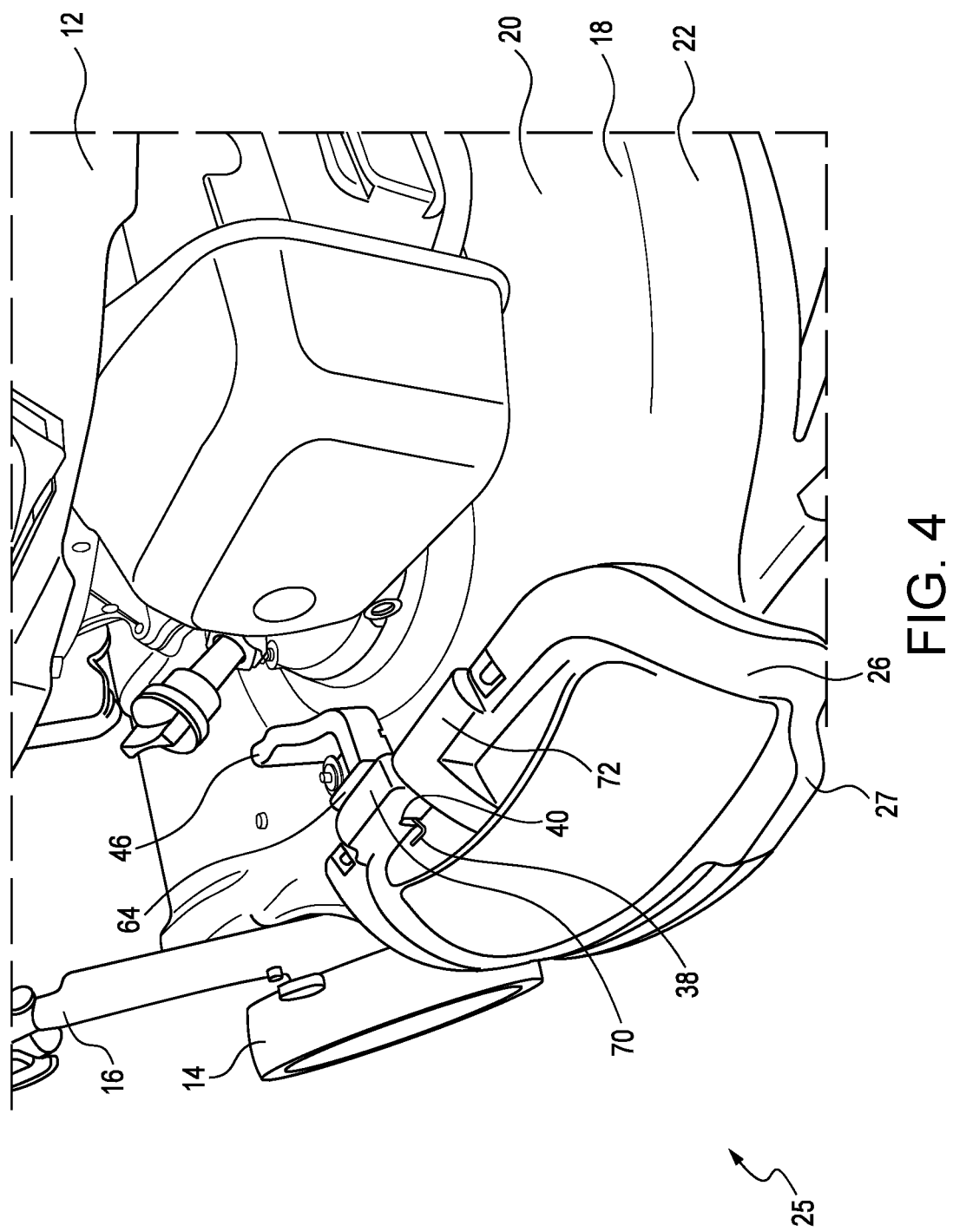
FIG. 4 is a perspective view of the discharge guard assembly of FIG. 2 in a closed and latched position.

Operation of the discharge guard assembly 25 will now be described. Referring to FIG. 4, a perspective view of the discharge guard assembly 25 is shown with the guard 26 in the closed position and the latch 46 in the latched position. In this arrangement, the mower 10 may be used in a mulching configuration since the opening 24 in the cutter housing 18 is closed by the guard 26, thereby preventing cuttings from being discharged through the opening 24. Movement of the guard 26 toward the open position is prevented by contact between the catch 64 and the stop 70.

Figure 5:
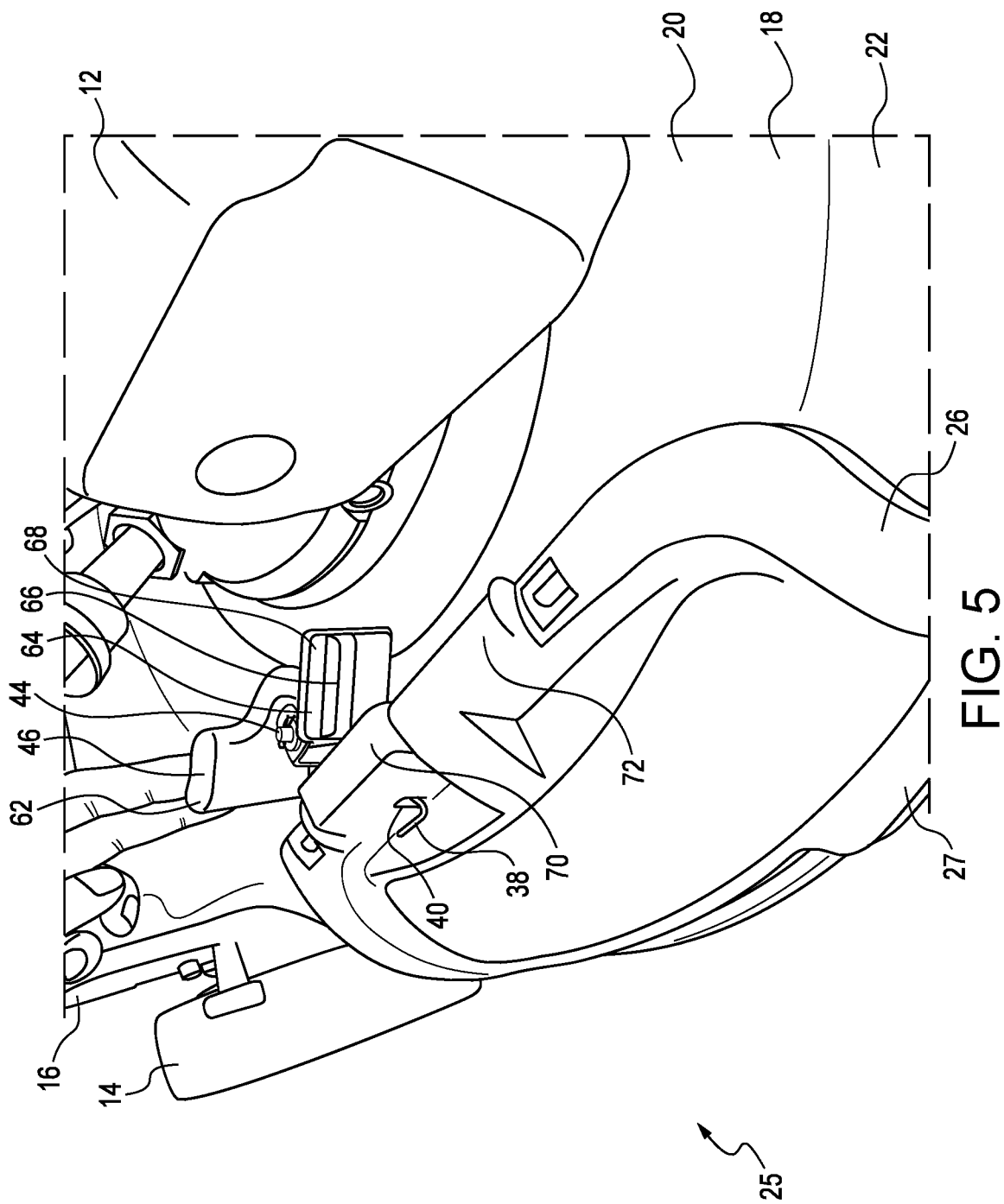
FIG. 5 is a perspective view of the discharge guard assembly of FIG. 2 in a closed and unlatched position.

When it is desired to move the discharge guard assembly 25 to the open position, a simple two-step process may be used. First, as shown in FIG. 5, which depicts a perspective view of the discharge guard assembly 25 with the guard 26 in the closed position and the latch 46 in the unlatched position, a user contacts the lever handle 62 of the latch 46 and rotates the latch 46 about the latch pin 44 against the biasing force of the second biasing member 48 (shown in FIG. 2). The catch 64 is then rotated away from the stop 70 to release the guard 26 to allow the guard 26 to be rotated.

Figure 6:
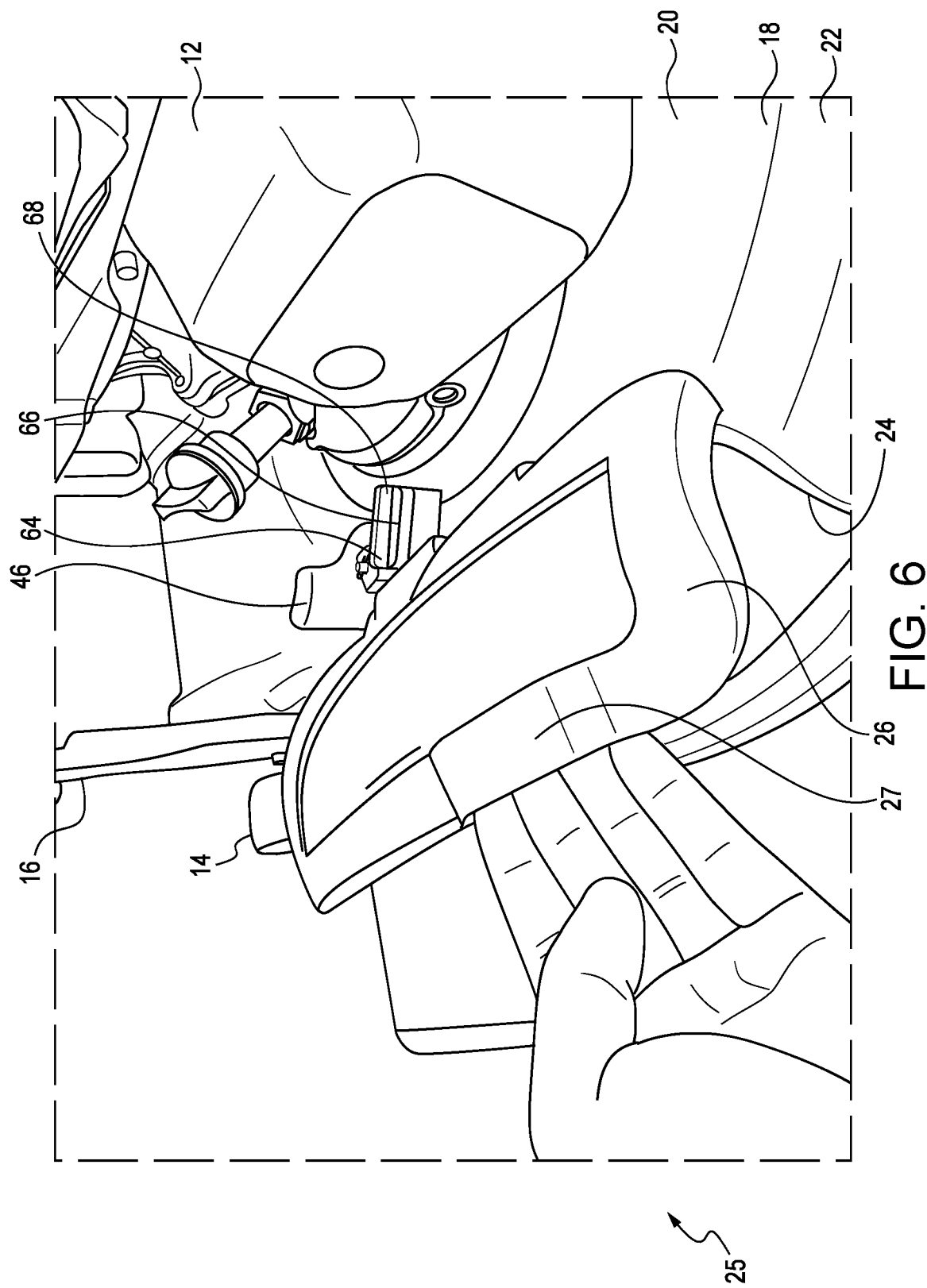
FIG. 6 is a perspective view of the discharge guard assembly of FIG. 2 in an unlatched and open position.

The second step of opening the discharge guard assembly 25 is shown in FIG. 6, which depicts a perspective view of the discharge guard assembly 25 with the latch 46 in the unlatched position and the guard 26 in the open position. The user simply grasps the guard handle 27 and lifts the guard 26 against the bias of the first biasing member 36 (shown in FIG. 2).

Figure 7:
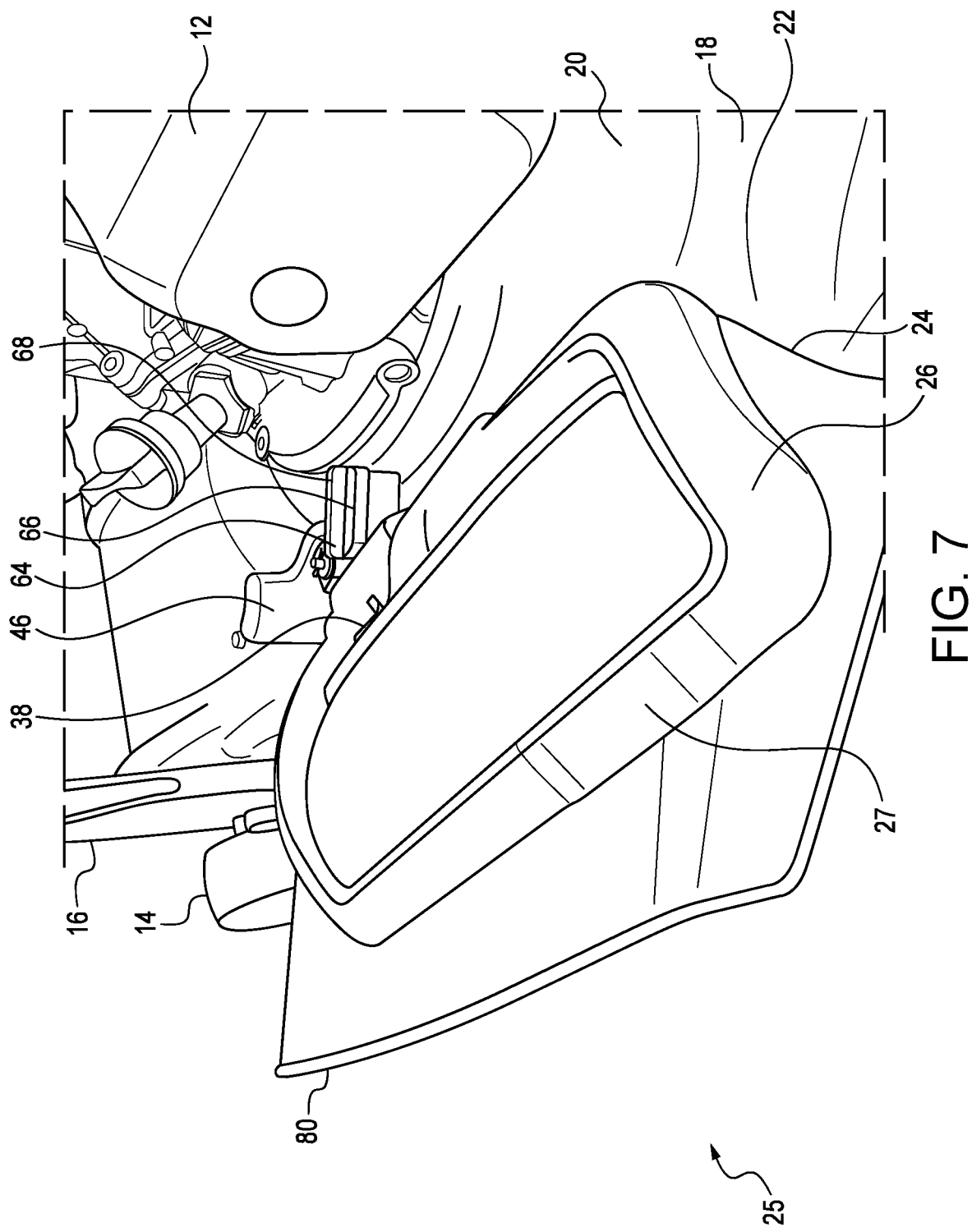
FIG. 7 is a perspective view of the discharge guard assembly of FIG. 2 in the unlatched and open position with a discharge chute installed.

As shown in FIG. 7, which depicts a perspective view of the discharge guard assembly 25 with the latch 46 in the unlatched position and the guard 26 in the open position, a discharge chute 80 can then be installed. The discharge chute 80 may be configured to direct cuttings away from the cutter housing 18 and to hold the guard 26 in the open position against the force of the first biasing member 36. The discharge chute 80 may be attached to the cutter housing 18 in any suitable manner known to those skilled in the art. In this arrangement, the mower 10 may be used in a grass discharge configuration to allow the cuttings to be discharged from the cutter housing 18. It will also be understood that a bag may be attached to the mower 10 or the discharge chute 80 such that the mower 10 may be used in a bagging configuration with the guard 26 in the open position.

When it is desired to change the discharge guard assembly 25 back to the closed and latched position as shown in FIG. 4 for use in a mulching configuration, the discharge chute 80 may simply be removed. The guard 26 may then move under the force of the first biasing member 36 and/or gravity to the closed position. The latch 46 may also automatically move to the latched position under the force of the second biasing member 48. Accordingly, the latch 46 automatically moves to the latched position when the guard 26 moves to the closed position to facilitate operation of the discharge guard assembly 25 and reliably latch the discharge guard assembly 25.

Figure 8:
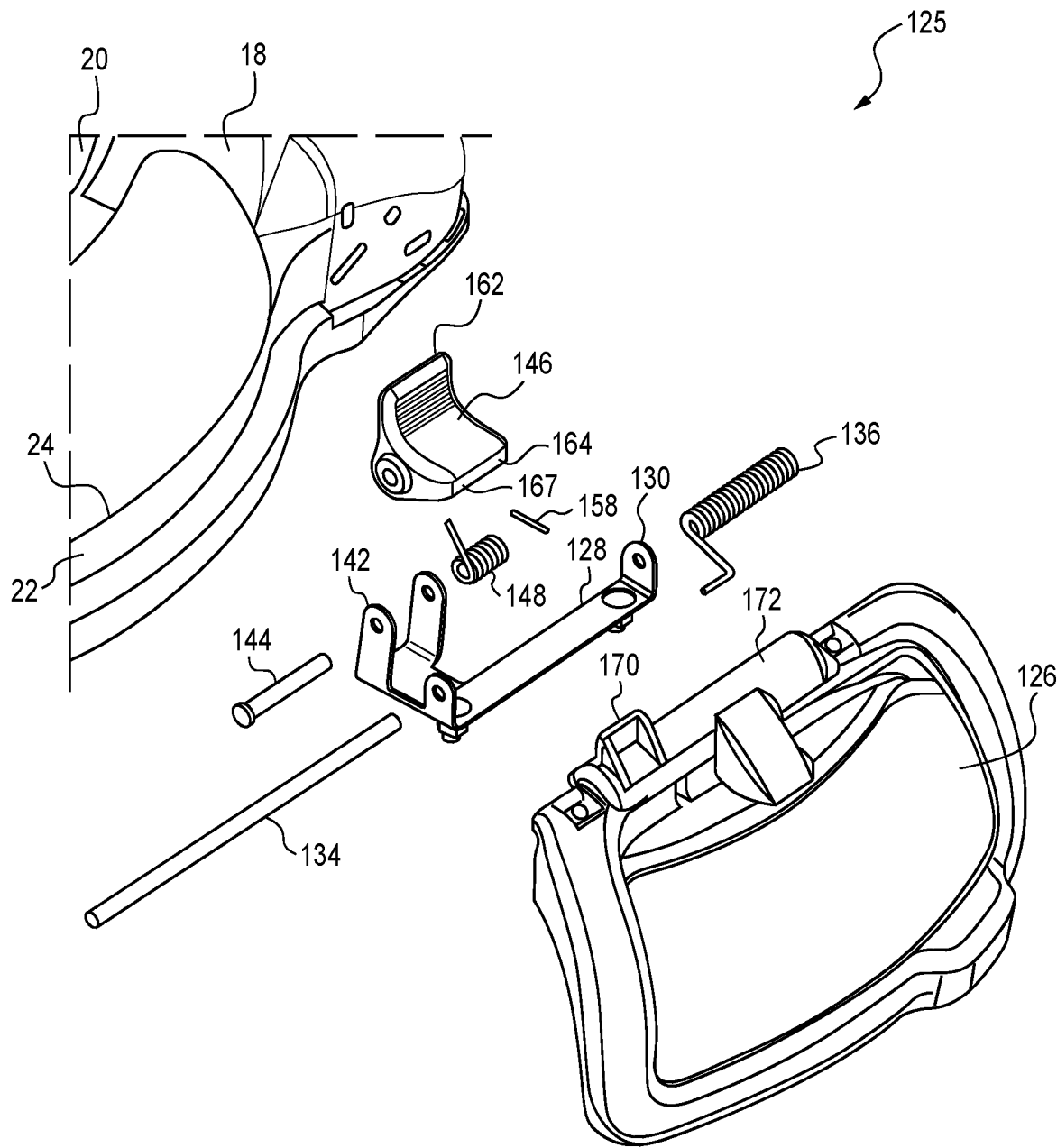
FIG. 8 is an exploded perspective view of a portion of an alternative embodiment discharge guard assembly.
Figure 9:
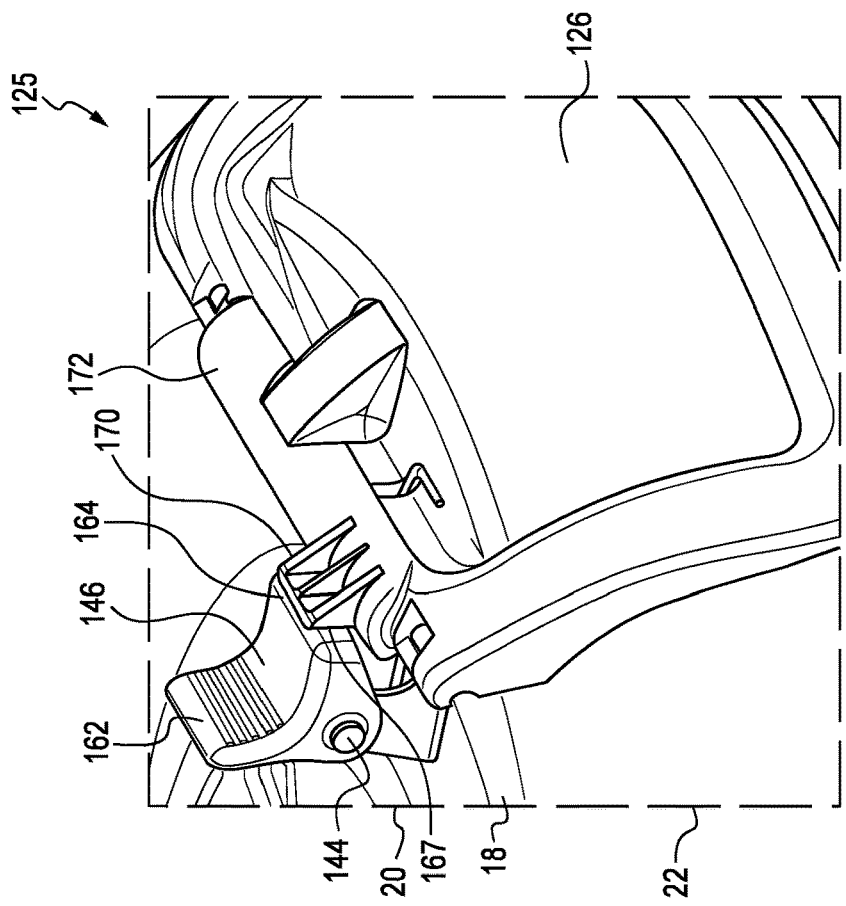
FIG. 9 is a perspective view of the discharge guard assembly of FIG. 8 in a closed and latched position.
Figure 10:
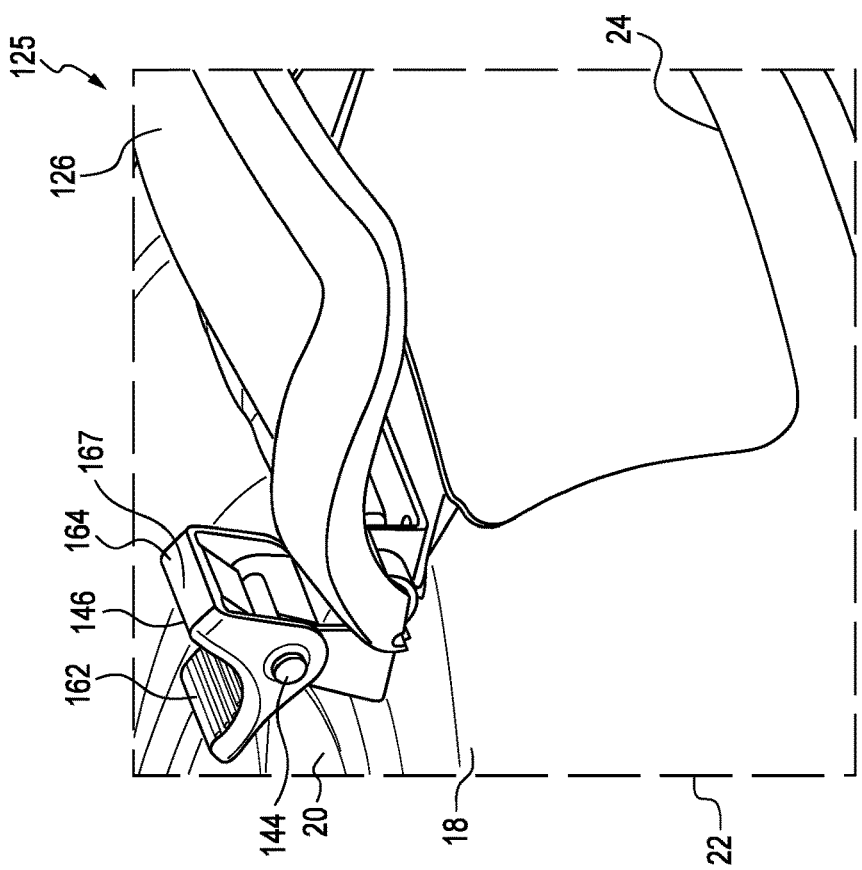
FIG. 10 is a perspective view of the discharge guard assembly of FIG. 8 in an unlatched and open position.

Referring now to FIG. 8, an exploded perspective view of an alternative embodiment discharge guard assembly is shown, indicated generally at 125. It will be appreciated that many of the features of the alternative embodiment discharge guard assembly 125 are similar to the embodiment previously discussed, and some of the different features will be discussed in more detail below.

The alternative embodiment discharge guard assembly 125 includes a guard 126 having a stop 170 projecting above a sleeve 172. One embodiment of the stop 170 is configured as a buttress extending above the sleeve 172. The stop 170 defines a surface area for contacting a latch 146. A bracket 128 may be provided for attaching the latch 146 and the guard 126 to the cutter housing 18. The bracket 128 may include a first pair of spaced apart tabs 130 for receiving a hinge pin 134 and a second pair of spaced apart tabs 142 for receiving a latch pin 144. In the alternative embodiment, the latch pin 144 may be arranged to be substantially parallel with the hinge pin 134. For example, both the hinge pin 134 and the latch pin 144 may extend substantially horizontally along a length of the guard 126. The latch 146 may form a substantial L shape in which one of the legs forms a latch handle 162 and the other leg forms a catch 164. The catch 164 may form an abutment surface 167 that is configured to contact the stop 170 when the guard 126 is in the closed position and the latch 146 is in the latched position, as shown most clearly in FIG. 9. The latch 146 may be rotated about the latch pin 144 so that the catch 164 is spaced apart from the stop 170. The guard 126 may then be rotated to the open position as shown most clearly in FIG. 10, which shows a perspective view of a portion of the alternative embodiment discharge guard assembly 125, with the latch 146 in the unlatched position and the guard 126 in the open position.

It will be appreciated that other elements of the alternative embodiment shown in FIG. 8, such as a first biasing member 136, a second biasing member 148, and a connection pin 158, correspond to similar elements in the first embodiment. Corresponding elements in the first embodiment are designated with the last two digits of the reference numbers in the alternative embodiment. Such corresponding elements are described more fully above with regard to the first embodiment.

It will be understood that the present disclosure provides a discharge guard assembly 25, 125 that is easy and convenient to operate, and effective in holding the guard 26, 126 in the closed position. Thus, the mower 10 can be configured to reliably hold the guard 26, 126 in the closed position for the mulching configuration. Moreover, the guard 26, 126 can be readily changed from the mulching configuration to the discharge configuration by a two-step process for lifting the guard 26, 126 from the closed position to the open position. Also, when the guard 26, 126 is placed in the closed position, the latch 46, 146 may be automatically latched. In addition, the present disclosure provides a discharge guard assembly 25, 125 that is efficient to manufacture and assemble.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended that the scope of the invention be defined by the claims appended hereto.

What is claimed is:

1. A discharge guard assembly for a mower comprising:
   a cutter housing having an opening for discharging cuttings;
   a guard attached to the housing for moving between a closed position, in which the guard covers the opening, and an open position;
   a pin connecting the guard to the cutter housing; and
   a latch having a catch for holding the guard in the closed position;
   wherein a stop is formed on the guard, and wherein the latch is movable from a latched position in which the catch contacts the stop to hold the guard in the closed position, to an unlatched position in which the guard is free to rotate about the pin; and
   wherein the guard includes a sleeve receiving the pin, and the stop is formed on the sleeve.

2. The discharge guard assembly of claim 1, further comprising a bracket attaching both the guard and the latch to the cutter housing.

3. The discharge guard assembly of claim 1, wherein the latch is rotatable about a substantially vertical axis.

4. The discharge guard assembly of claim 1, further comprising a first biasing member to bias the guard to the closed position.

5. The discharge guard assembly of claim 1, wherein the stop extends along a length of the pin, and a space is defined between the stop and the pin.

6. The discharge guard assembly of claim 5, wherein the catch comprises a lateral extending portion and an upward extending portion, and the lateral extending portion is positioned in the space between the stop and the pin when the latch is in the latched position.

7. The discharge guard assembly of claim 1, comprising a second biasing member to bias the latch to the latched position.

8. The discharge guard assembly of claim 1, wherein the latch is rotatable about an axis that is substantially parallel to the pin.

9. A discharge guard assembly for a mower comprising:
   a cutter housing having an opening for discharging cuttings;
   a guard attached to the housing for moving between a closed position, in which the guard covers the opening, and an open position;
   a pin connecting the guard to the cutter housing; and
   a latch having a catch for holding the guard in the closed position;
   wherein a stop is formed on the guard, and wherein the latch is movable from a latched position in which the catch contacts the stop to hold the guard in the closed position, to an unlatched position in which the guard is free to rotate about the pin; and
   wherein the latch is rotatable about a substantially vertical axis.

10. The discharge guard assembly of claim 9, further comprising a bracket attaching both the guard and the latch to the cutter housing.

11. The discharge guard assembly of claim 9, further comprising a first biasing member to bias the guard to the closed position.

12. The discharge guard assembly of claim 9, wherein the stop extends along a length of the pin, and a space is defined between the stop and the pin.

13. The discharge guard assembly of claim 12, wherein the catch comprises a lateral extending portion and an upward extending portion, and the lateral extending portion is positioned in the space between the stop and the pin when the latch is in the latched position.

14. The discharge guard assembly of claim 9, comprising a second biasing member to bias the latch to the latched position.

15. A discharge guard assembly for a mower comprising:
   a cutter housing having an opening for discharging cuttings;
   a guard attached to the housing for moving between a closed position, in which the guard covers the opening, and an open position;
   a pin connecting the guard to the cutter housing; and
   a latch having a catch for holding the guard in the closed position;
   wherein a stop is formed on the guard, and wherein the latch is movable from a latched position in which the catch contacts the stop to hold the guard in the closed position, to an unlatched position in which the guard is free to rotate about the pin; and
   a bracket attaching both the guard and the latch to the cutter housing independent of each other.

16. The discharge guard assembly of claim 15, wherein the latch is rotatable about a substantially vertical axis.

17. The discharge guard assembly of claim 15, further comprising a first biasing member to bias the guard to the closed position.

18. The discharge guard assembly of claim 15, wherein the stop extends along a length of the pin, and a space is defined between the stop and the pin.

19. The discharge guard assembly of claim 18, wherein the catch comprises a lateral extending portion and an upward extending portion, and the lateral extending portion is positioned in the space between the stop and the pin when the latch is in the latched position.

20. The discharge guard assembly of claim 15, comprising a second biasing member to bias the latch to the latched position.

* * * * *